United States Patent [19]

Tomioka

[11] Patent Number: 5,758,741
[45] Date of Patent: Jun. 2, 1998

[54] VEHICLE POWER STEERING SYSTEM

[75] Inventor: Eiichi Tomioka. Saitama. Japan

[73] Assignee: Jidosha Kiki Co., Ltd., Tokyo, Japan

[21] Appl. No.: 547,133

[22] Filed: Oct. 24, 1995

[30] Foreign Application Priority Data

| Oct. 31, 1994 | [JP] | Japan | 6-266705 |
| Oct. 31, 1994 | [JP] | Japan | 6-266707 |
| Oct. 31, 1994 | [JP] | Japan | 6-266712 |

[51] Int. Cl.$^6$ ................................................ B62D 5/04
[52] U.S. Cl. ................................................ 180/446; 701/41
[58] Field of Search ................................ 180/443, 446; 364/424.051, 424.053

[56] References Cited

U.S. PATENT DOCUMENTS

| 4,837,690 | 6/1989 | Morishita et al. | 364/424.053 |
| 4,869,334 | 9/1989 | Marumoto et al. | 180/466 |
| 4,875,539 | 10/1989 | Abukawa et al. | 180/446 |
| 4,934,473 | 6/1990 | Fushimi et al. | 180/446 |
| 5,039,926 | 8/1991 | Morishita et al. | 318/434 |
| 5,563,790 | 10/1996 | Wada et al. | 364/424.051 |

*Primary Examiner*—Robert J. Oberleitner
*Assistant Examiner*—Avraham Lerner
*Attorney, Agent, or Firm*—Sughrue, Mion, Zinn, Macpeak & Seas, PLLC

[57] ABSTRACT

A vehicle power steering system for controlling an assist force which supplementally supports the steering operation, includes a motor for producing the assist force, a battery for supplying a current to the motor, a speed sensor for detecting a vehicle speed, a steering-wheel angle sensor for detecting an angle of a steering wheel, a circuit for adjusting the current fed from the battery to the motor according to the vehicle speed detected by the speed sensor and the angle of the steering-wheel detected by the steering-wheel angle sensor, a booster inserted in a current feed path to the motor for boosting a battery voltage of the battery to apply a boosted voltage to the motor. The vehicle power steering system further may include a boosted-voltage stabilizer for controlling the boosted voltage to a predetermined value through an operation of monitoring the boosted voltage. The vehicle power steering system further may include a boosted-voltage decreasing unit for decreasing the boosted voltage according to the drop rate of the battery voltage when the boosted-voltage decreasing unit detects that the boosted voltage is smaller than a first predetermined value through the operation of monitoring the voltage of the battery.

8 Claims, 9 Drawing Sheets

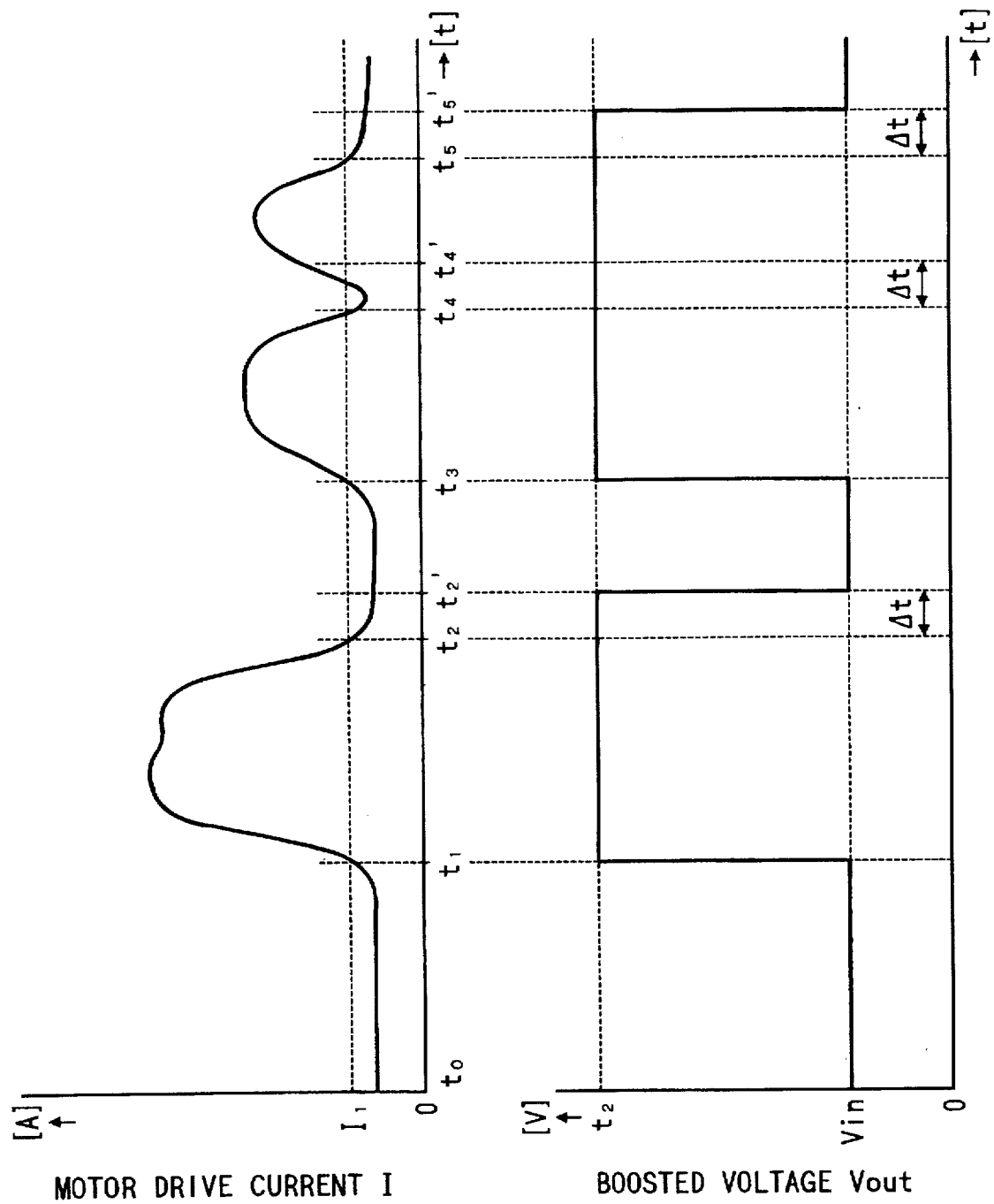

VEHICLE POWER STEERING SYSTEM

BACKGROUND OF THE INVENTION

1. Field of the Invention

The present invention relates to a vehicle power steering system for controlling an assist force, which supplementally supports the steering operation, by adjusting a current fed from a car-carried battery to a motor in accordance with a vehicle speed derived from a speed sensor and an angle of the steering wheel from a steering-wheel angle sensor.

2. Discussion of the Related Art

A motor drive power steering system (MDPS) having a basic construction as shown in FIG. 1, is known as this type of the power steering system. In the figure, reference numeral 1 designates a car-carried battery; 2, an alternator; 3, an engine; 4, a speed sensor; 5, a steering-wheel angle sensor; 6, a power steering unit; 7, a motor driven pump; 8, an ignition switch; 9, a signal controller; and 10, a power controller.

In the MDPS thus constructed, a vehicle speed derived from the speed sensor 4 and an angle of the steering wheel from the steering-wheel angle sensor 5 are transferred to the signal controller 9. The signal controller 9 processes these signals received from the sensors 4 and 5 to generate a motor drive signal. The motor drive signal is applied to the power controller 10. The power controller 10 adjusts the current fed from the car-carried battery 1 to the motor driven pump 7 in accordance with the motor drive signal from the signal controller 9.

An oil pressure in a fluid path connecting to the power steering unit 6 is controlled by the adjusted current in the following manner.

When the vehicle runs at low speed, the assist force is increased to reduce the force for steering, viz., to provide a light steering feel. When it runs at medium and high speed, the assist force is decreased to increase the force for steering, viz., to provide a heavy steering feel.

In the MDPS, the battery voltage (DC 12 V) is directly applied to the motor driven pump 7, from the car-carried battery 1. The motor specified for DC 12 V is used for the motor driven pump 7-1.

Thus, a large current is fed to the motor driven pump 7-1, to thereby produce a large torque. This leads to an inevitable increase of the size of the motor 7-1, the increased thickness of the wires for their electrical connection, and an increase of the costs of the overall system.

The battery voltage of the car-carried battery 1 varies depending on the magnitude of a load of the battery. A variation of the battery voltage, caused by the load variation, affects an influence on the motor driven pump 7-1, and hence the assist force for the steering wheel operation. To be more specific, the battery voltage is low, that is, 12 V, and the low battery voltage is directly applied to the motor driven pump 7-1. Because of this, a little variation of the battery voltage causes a great variation of the torque generated by the motor driven pump 7-1. As a result, an accuracy of the control of the assist force is deteriorated.

The description of the power steering system thus far concerns the motor vehicle driven by an internal combustion engine. The same thing is correspondingly applied to the power steering system assembled into an electrically driven vehicle (EV). In the case of the EV, the main voltage supply source consists of only the battery. As a result, the voltage variation is great.

The same problem arises not only in the MDPS but also in a full electric power steering system (FEPS) in which the motor controls the assist force of the power steering unit directly, not by way of the oil path.

SUMMARY OF THE INVENTION

The present invention has been made to solve the above problems, and has an object to provide a vehicle power steering system which realizes the reduction of the motor size and the thinning of wires for electric connection and hence the reduction of costs of the overall system, is little influenced by the battery voltage variation, is capable of accurately controlling the assist force, and eliminates a wasteful energy consumption, thereby securing the energy saving.

To achieve the above object, according to a first aspect of the invention, there is provided a vehicle power steering system, which includes a boosting circuit, inserted in a current feed path to the motor, for boosting a battery voltage of the car-carried battery and applying the boosted one to the motor.

In the vehicle power steering system, the boosting circuit may apply the boosted one as a boosted voltage Vout to the motor, and the vehicle power steering system may further include boosted-voltage stabilizing means for controlling the boosted voltage Vout to a fixed value of voltage through an operation of monitoring the boosted voltage Vout.

The vehicle power steering system may further include boosted-voltage decreasing means for decreasing the boosted voltage Vout at the current decreasing rate of the battery voltage when the boosted-voltage decreasing means detects that the boosted voltage goes below a first preset voltage value V1, through the operation of monitoring a battery voltage of the car-carried battery.

The vehicle power steering system may further include fail-safe means for decreasing the boosted voltage Vout at a preset gradient when the fail-safe means detects that a state of the boosted voltage being below a first preset voltage value V1, continues for a time duration Δt or longer, through the operation of monitoring a battery voltage of the car-carried battery.

The fail-safe means may decrease the boosted voltage Vout at a preset gradient when the fail-safe means detects that the battery voltage goes below a second preset voltage value V2, through the operation of monitoring a battery voltage of the car-carried battery.

In the vehicle power steering system of the first aspect of the invention, the battery voltage is boosted and the boosted one is applied to the motor in the form of the boosted voltage Vout.

Also, in the vehicle power steering system of the invention, the boosted voltage Vout is monitored and controlled to a fixed value of voltage.

Further, in the vehicle power steering system of the invention, when the boosted voltage goes below a first preset voltage value V1, the boosted voltage Vout at the current decreasing rate of the battery voltage.

Still further, in the vehicle power steering system of the invention, when a state of the boosted voltage being below a first preset voltage value V1 continues for a time duration Δt or longer, the boosted voltage Vout gradually decreases at a preset gradient.

Yet still further, in the vehicle power steering system of the invention, when the battery voltage goes below a second preset voltage value V2, the boosted voltage Vout decreases at a preset gradient.

According to a second aspect of the invention, there is provided a vehicle power steering system, which includes a boosting circuit, inserted in a current feed path to the motor, for boosting a battery voltage of the car-carried battery and applying to the motor the boosted one as a boosted voltage Vout, and voltage decreasing means for holding down the boosting operation of the boosting circuit in accordance with a steering condition, to thereby decrease the boosted voltage Vout.

The voltage decreasing means may hold down the boosting operation of the boosting circuit in accordance with a running condition, to thereby decrease the boosted voltage Vout.

The voltage decreasing means may hold down the boosting operation of the boosting circuit in accordance with steering and running conditions, to thereby decrease the boosted voltage Vout.

In the vehicle power steering system of the second aspect of the invention, a battery voltage is boosted and applied to the motor. When a state of no steering operation continues for a preset time duration, the boosting operation of the boosting circuit is held down to reduce the boosted voltage Vout. In this case, the boosting operation may be stopped, if necessary.

Also, a battery voltage is boosted and applied to the motor. When the vehicle speed exceeds a preset value of speed, the boosting operation of the boosting circuit is held down to reduce the boosted voltage Vout. In this case, the boosting operation may be stopped, if necessary.

Further, a battery voltage is boosted and applied to the motor. When a state of no steering operation continues for a preset time duration or the vehicle speed exceeds a preset value of speed, the boosting operation of the boosting circuit is held down to reduce the boosted voltage Vout. In this case, the boosting operation may be stopped, if necessary.

According to a third aspect of the invention, there is provided a vehicle power steering system, which includes a boosting circuit inserted in a current feed path to the motor, for boosting a battery voltage of the car-carried battery to apply to the motor the boosted one as a boosted voltage Vout, and voltage increasing means which monitors a load of the motor for increasing the boosted voltage Vout when the load of the motor is equal to or exceeds a preset value I1.

When the load of the motor is smaller than a preset value I1 for a preset time period Δt, the voltage increasing means may decreases the boosted voltage Vout.

The voltage increasing means may vary the boosted voltage Vout in accordance with the load monitored.

In the vehicle power steering system of the third aspect of the invention, when the load of the motor exceeds a preset value I1, the boosted voltage Vout applied to the motor is increased. In a specific example, when the current fed to the motor exceeds a preset value I1, the boosted voltage Vout is increased from 12 V (the minimum value=battery voltage) to 100 V (the maximum value).

Also, when the load of the motor is indicated by a value above a preset value I1, the boosted voltage Vout is increased. When a state that the load of the motor, indicated by a value below a preset value I1, continues for a preset time period Δt, the boosted voltage Vout is decreased. In a specific example, when the current fed to the motor exceeds a preset value I1, the boosted voltage Vout is increased from 12 V (the minimum value=battery voltage) to 100 V (the maximum value). When a state that the load of the motor is indicated by a value below a preset value I1 continues for a preset time period Δt, the boosted voltage Vout is decreased from 100 V to 12 V.

Further, the boosted voltage Vout varies in accordance with a load of the motor. For example, the boosted voltage Vout is increased as the current fed to the motor increases. It is deceased as the current decreases.

BRIEF DESCRIPTION OF THE DRAWINGS

FIGS. 9A and 9B are graphs showing variations of a motor drive current I and a boosted voltage Vout, respectively.

DETAILED DESCRIPTION OF THE PREFERRED EMBODIMENTS

Figure 1:
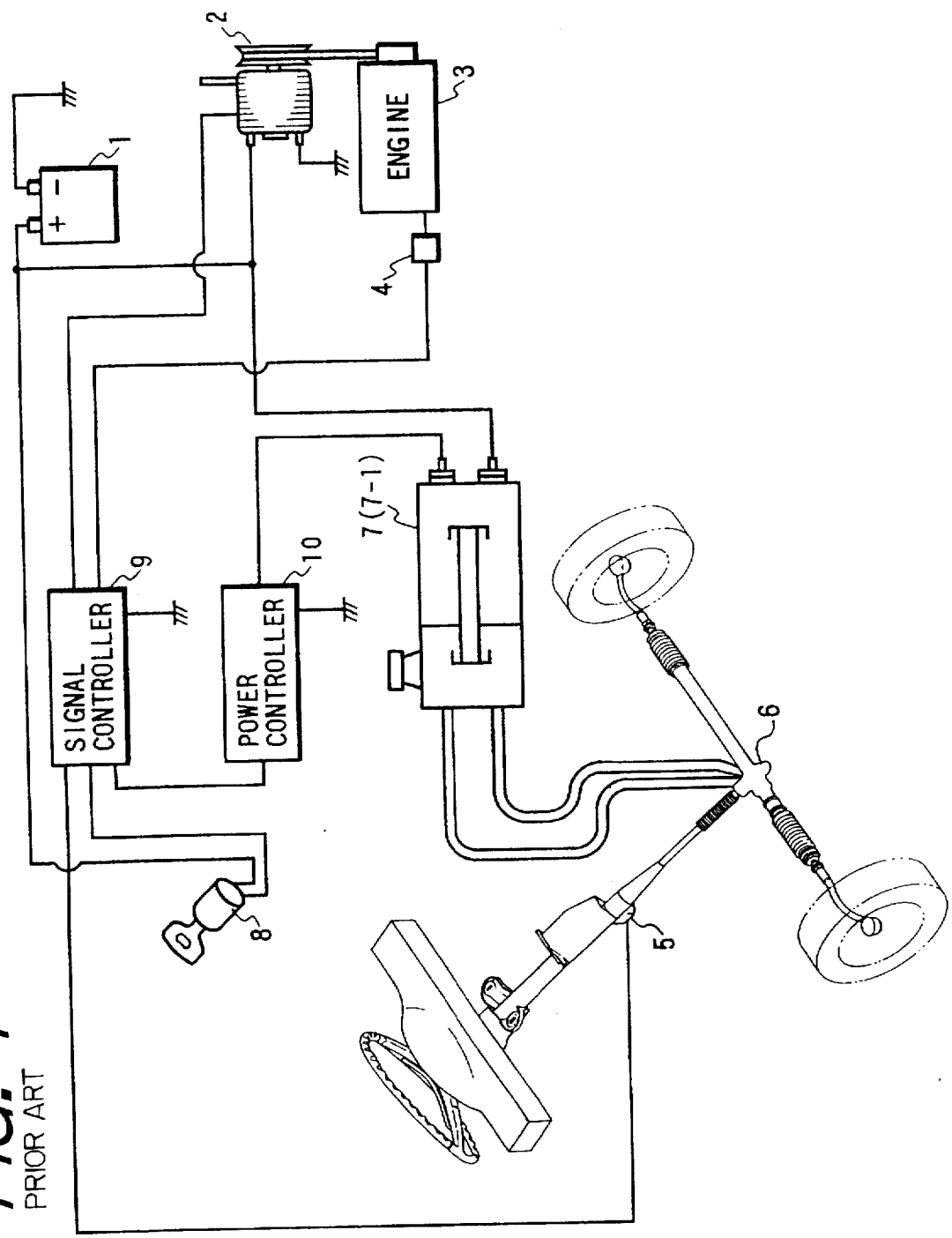
FIG. 1 is a diagram in block and schematic form the concept of a conventional MDPS.
Figure 2:
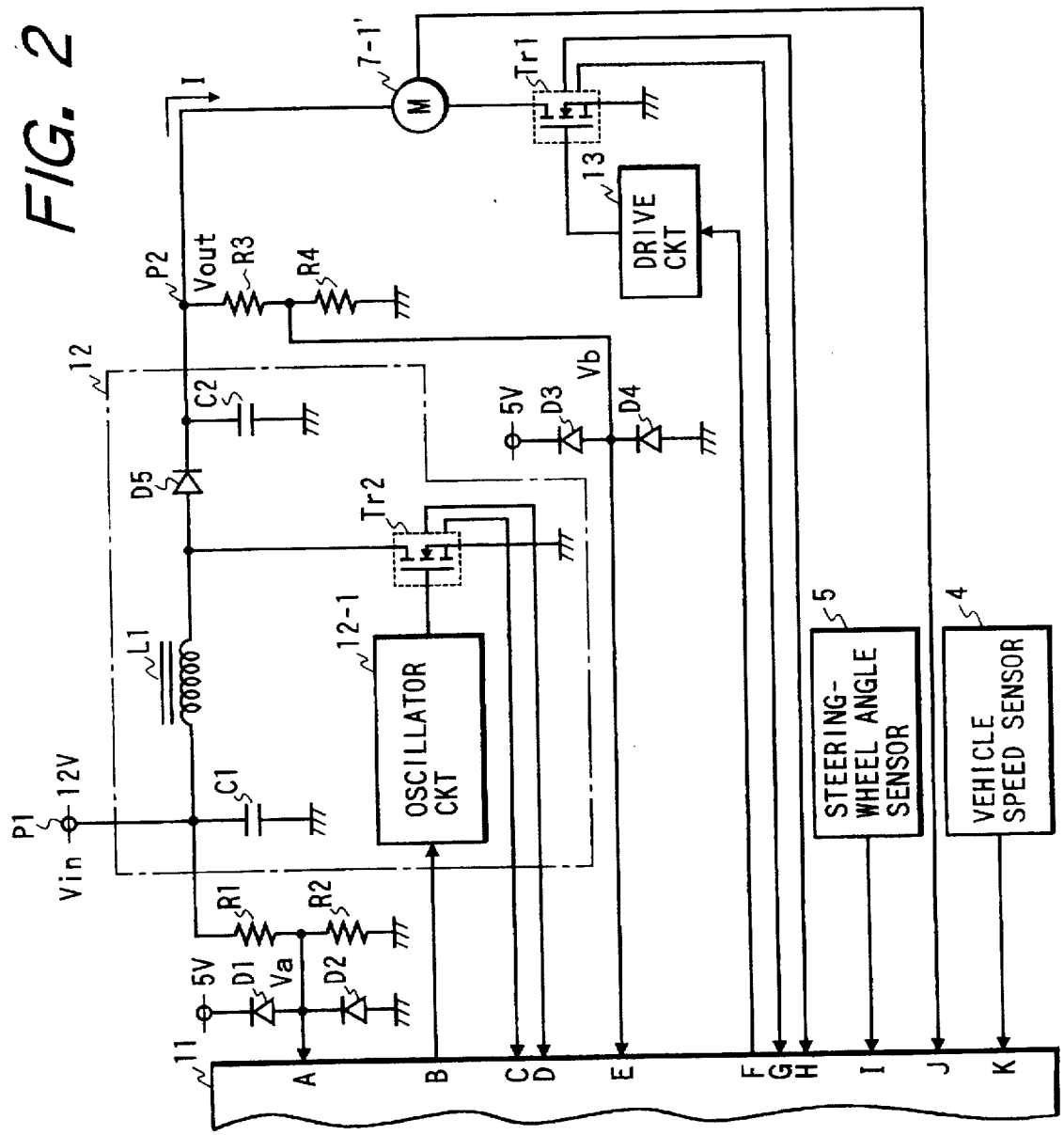
FIG. 2 is a circuit diagram showing a major portion of an MDPS according to an embodiment of the present invention.

A preferred embodiment of the present invention will be described with reference to the accompanying drawings. FIG. 2 is a circuit diagram showing a key portion of an MDPS (motor drive power steering system) according to an embodiment of the present invention. In the figure, reference numeral 4 designates a speed sensor 4 ; 5, a wheel angle sensor; 7-1', a motor for a pump; 11, a microcomputer; 12, a boosting circuit; 13, a drive circuit; Tr1, a power transistor; D1 to D4, diodes; and R1 to R4, resistors.

The boosting circuit 12 is inserted in a current supply route from a car-carried battery to the motor 7-1'. More exactly, it is connected between a point P1 for receiving a battery voltage Vin (DC 12 V) from the car-carried battery and another point P2 for applying a voltage to the motor 7-1'. The boosting circuit 12 is made up of capacitors C1 and C2, a coil L1, a diode D5, a switching transistor Tr2, and an oscillator circuit 12-1.

The microcomputer 11 includes terminals A to K. The microcomputer 11 receives at the terminal A a divided voltage Va formed by resistors R1 and R2, and at the terminal E a divided voltage Vb formed by resistors R3 and R4. The microcomputer 11 detects a battery voltage Vin that is received at the voltage receiving point P1, from the divided voltage Va, and detects a boosted voltage Vout appearing at the voltage applying point P2 from the divided voltage Vb. In a third embodiment which will be described later, when the battery voltage Vin drops to below a preset value of voltage, the microcomputer decreases the boosted voltage Vout or controls it to the battery voltage Vin. Further, the microcomputer turns on a warning lamp (not shown) to give warning to a driver.

The microcomputer 11 receives at the terminal I a signal representative of an angle of the steering wheel from the wheel angle sensor 5, and receives at the terminal K a signal representative of a speed of the vehicle from the speed sensor 4. The microcomputer 11 generates a motor drive signal on the basis of the speed signal and the wheel angle signal from the speed sensor 4 and the wheel angle 5, and outputs the motor drive signal from the terminal F to the drive circuit 13.

The microcomputer 11 receives at the terminal C information of temperature of the transistor Tr2, and at the terminal D information of current flowing through the transistor Tr2. The microcomputer 11 receives at the terminal G information of temperature of the transistor Tr1, and at the terminal H information of current flowing through the transistor Tr1. The microcomputer 11 receives at the terminal J information of a motor rotational speed of the motor 7-1'.

The microcomputer 11 sends a signal indicative of a duty ratio from the terminal B thereof to the oscillator circuit 12-1 of the boosting circuit 12. The duty ratio signal determines a duty ratio of a pulse wave outputted from the oscillator circuit 12-1 to the transistor Tr2. In the present invention, an oscillation frequency of the oscillator circuit 12-1 is 20 kHz.

(Basic Operation of the Boosting Circuit 12)

The basic operation of the boosting circuit 12 will be described. A storage and discharge of energy by the coil L1 is repeated through a switching operation of the transistor Tr2 that is caused by a pulse signal from the oscillator circuit 12-1. A high voltage appears at the cathode of the diode D5 when the coil discharges energy.

To be more specific, when the transistor Tr2 is turned on, current flows into the coil L1. When it is turned off, the current flowing through the coil L1 is stopped. At this time, a high voltage is generated so as to impede a change of magnetic flux caused by the stopping of the current flow, and appears at the cathode of the diode D5. This process is repeated, so that a high voltage repetitively appears at the cathode of the diode D5. The high voltage is smoothed by the capacitor C2, and the resultant appears, a boosted voltage Vout, at the point P2.

The boosted voltage Vout, generated by the boosting circuit 12, varies in accordance with a duty ratio command value issued from the microcomputer 11 through the terminal B thereof. The boosted voltage Vout is increased when the boosting circuit receives a large duty ratio command value from the microcomputer. It is decreased when the boosting circuit receives a small duty ratio command value. In other words, a large duty ratio of the pulse signal, which is outputted from the oscillator circuit 12-1 to the transistor Tr2, will provide a large boosted voltage Vout, while a small duty ratio thereof will provide a small boosted voltage Vout.

In the present embodiment, the boosted voltage Vout is set at 100 V. Accordingly, the motor 7-1'is a motor (DC brush motor), designed to be operable at 100 V, not 12 V. The present embodiment uses a high voltage type motor, designed to produce a large torque by small current for the motor 7-1'.

By using this type of the motor, size reduction of the motor 7-1' is realized and use of thinned wires is allowed, so that the cost of the overall system is reduced. Since the boosted voltage Vout is set at 100 V, inexpensive, home use components may be used. In the present embodiment, the boosted voltage Vout varies little when the battery voltage Vin varies. Accordingly, the assist force can accurately be controlled while being little influenced by a variation of the battery voltage Vin.

In recent marked progress of this field, the transistors of high power but low loss are commercially available at low cost. Because of this, the boosting circuit 12 using such a transistor can be manufactured at low cost. An increase of the cost, caused by using the boosting circuit 12, can readily be canceled out by the cost reduction which results from the size reduction of the motor 7-1' and the use of thinned wires. Accordingly, the total cost of the overall system is reduced.

The oscillation frequency of the oscillator circuit 12-1, which is 20 kHz in the embodiment, may further be increased. If so done, a small coil can be used for the coil L1. Use of the small coil leads to the size and cost reduction, as a matter of course. The upper limit of the oscillation frequency of the oscillator circuit 12-1 is determined in connection with the switching speed of the transistor Tr2. Where a transistor of high switching speed is used for the transistor Tr2, the oscillation frequency may be increased.

In the present embodiment, the oscillator circuit 12-1 is contained in the boosting circuit 12. It may be omitted, if required. In this case, the microcomputer 11 outputs a pulse signal of an adjusted duty ratio from the terminal B thereof and applies it to the power transistor Tr1.

(Operation of the Microcomputer 11 according to a First Embodiment)

Figure 3:
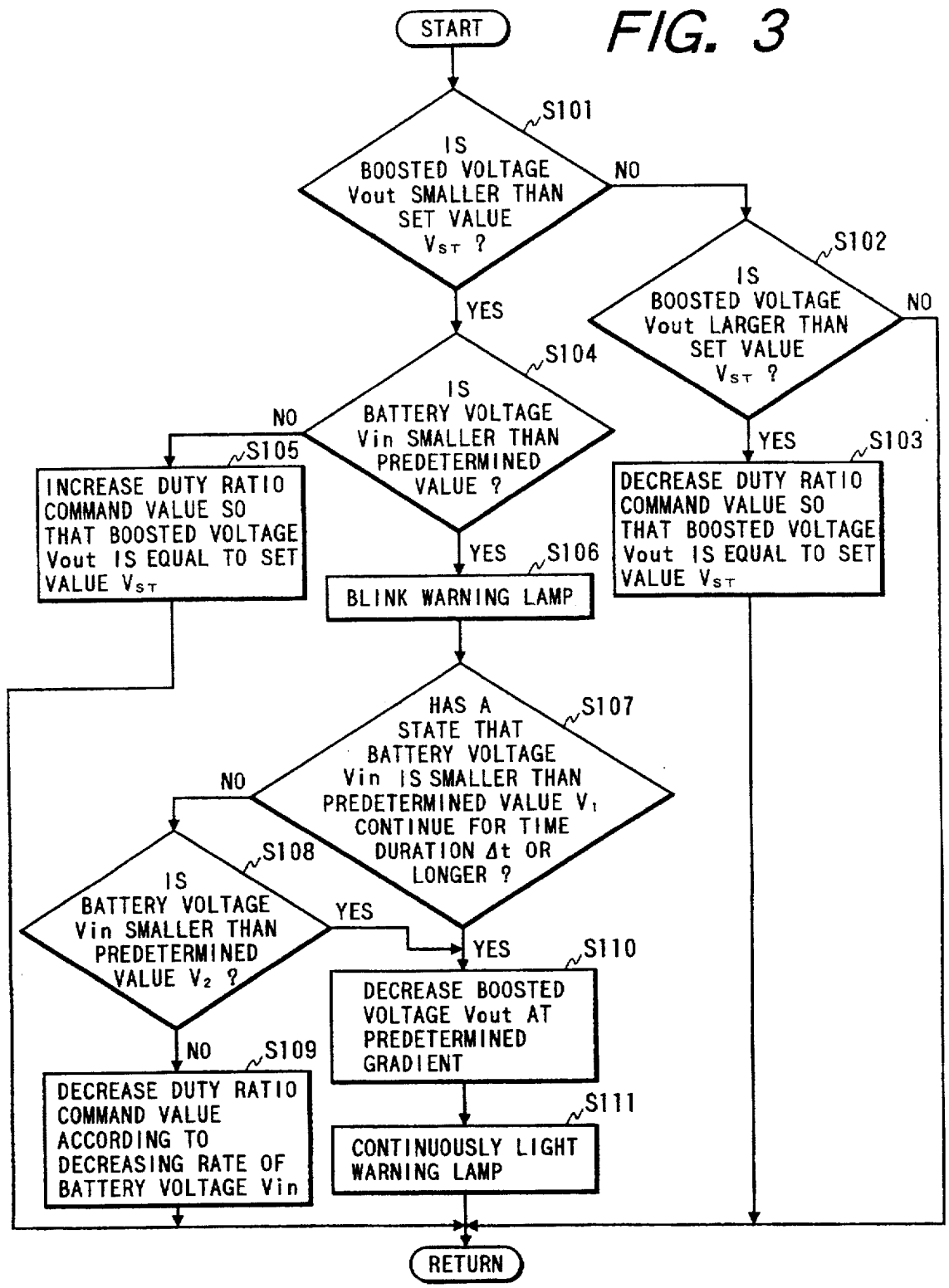
FIG. 3. is a flowchart showing a flow of a process carried out by a microcomputer shown in FIG. 2 according to a first embodiment.

The operation and some functions of the microcomputer 11 in accordance with a first embodiment of the invention will be described with reference to FIG. 3.

The microcomputer 11 receives a divided voltage Vb at the terminal E, and detects a boosted voltage Vout to be applied to the motor 7-1', from the divided voltage Vb. The microcomputer 11 compares the boosted voltage Vout with a set value $V_{ST}$ ($V_{ST}$=100 V) (step S101 in FIG. 3). If the boosted voltage Vout is not smaller than the set value $V_{ST}$, the microcomputer 11 confirms that Vout≧$V_{ST}$ (step S102), and decreases a duty ratio command value to be outputted from the terminal B thereof so that the boosted voltage Vout is equal to the set value $V_{ST}$ (step S103).

In the step S101, if the boosted voltage Vout is smaller than the set value $V_{ST}$, the microcomputer 11 advances to a step S104. In this step, the microcomputer 11 detects a battery voltage Vin from a divided voltage Va, which receives at the terminal A, and checks whether or not the battery voltage Vin is smaller than a first preset voltage value V1 (e.g., V1=9.5 V). If the battery voltage Vin is larger than the first preset voltage value V1, the microcomputer 11 increases a duty ratio command value to be outputted from the terminal B thereof so that the boosted voltage Vout is equal to the set value $V_{ST}$ (step S105).

Through the operations of the steps S101 to S105, the boosted voltage Vout applied to the motor 7-1' is monitored, and the boosted voltage Vout is kept at the set value $V_{ST}$ on the basis of the result of the monitoring operation. Thus, the boosted voltage Vout is controlled to be equal in level to the set value $V_{ST}$ when the battery voltage Vin is larger than the first preset voltage value V1. Accordingly, the assist force can accurately be controlled while being little influenced by a variation of the battery voltage Vin.

If the battery voltage Vin is smaller than the first preset voltage value V1 in the step S104, the microcomputer 11 causes a warning lamp (not shown) to blink (step S106), and goes to a step S107. In the step S107, the microcomputer 11 checks if a state that the battery voltage Vin is smaller than the first preset voltage value V1 has continued for a time duration Δt or longer. If the answer is NO, the microcomputer 11 advances to a step S108.

In the step S108, the microcomputer 11 checks if the battery voltage Vin is smaller than a second preset voltage value V2 (e.g., V2=8.5 V), which is smaller than the first preset voltage value V1. If the battery voltage Vin is larger than the second preset voltage value V2, the microcomputer 11 decreases a duty ratio command value that will be outputted from the terminal B, in accordance with a decreasing rate of the battery voltage Vin, to thereby decrease the boosted voltage Vout (step S109). This leads to the lessening of the load to the car-carried battery, possibly quickening the restoration of the battery voltage Vin to its normal level of voltage.

In the step S107, if the state of Vin<V1 continues for Δt or more, viz., the battery voltage Vin has been continued for the preset time duration Δt or longer, and drops below the first preset voltage value V1, the microcomputer 11 judges that something is wrong with a system including the battery, and on this judgement, gradually decreases the boosted voltage Vout at a preset gradient (step S110). With progression of the decrease of the boosted voltage Vout, it eventually drops to below the battery voltage Vin. In this way, a fail-safe function can be secured while naturally decreasing the assist force, viz., without abruptly decreasing the assist force.

After executing the process of the step S110 to decrease the boosted voltage Vout at a preset gradient, the microcomputer 11 switches a light furnishing mode of the warning lamp from a blinking mode to a continuous mode (step S111). If the battery voltage Vin is smaller than the second preset voltage value V2, the microcomputer 11 judges that the battery system is abnormal, and advances to the step S110. In this step, the microcomputer 11 gradually decreases the boosted voltage Vout at a given gradient. And when the boosted voltage Vout decreases to be below the battery voltage Vin, the fail-safe function is immediately operated.

Figures 4A, 4B:
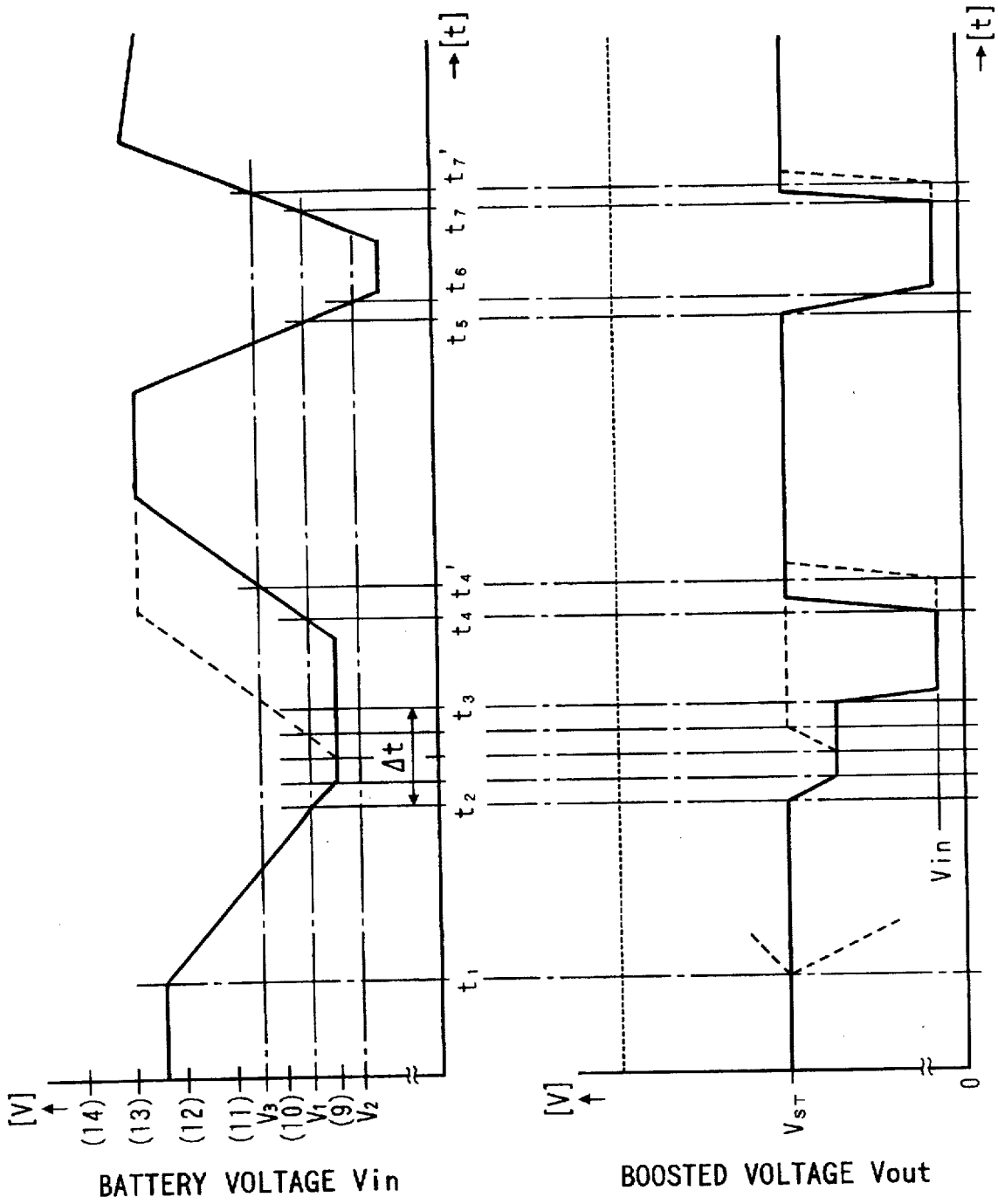
FIGS. 4A and 4B are graphs showing variations of a battery voltage Vin and a boosted voltage Vout, respectively.

FIG. 4A shows a variation of the battery voltage Vin, and FIG. 4B, a variation of the boosted voltage Vout.

If, at time t1, the battery voltage Vin starts to decrease, and the boosted voltage Vout also starts to decrease as indicated by a broken line with respect to the set value $V_{ST}$, the microcomputer 11 increases a duty ratio command value, which is to be delivered to the oscillator circuit 12-1, thereby keeping the boosted voltage Vout at the set value $V_{ST}$. If, at time t1, the battery voltage Vin starts to increase, and the boosted voltage Vout also starts to increase as indicated by a broken line with respect to the set value $V_{ST}$, the microcomputer 11 decreases a duty ratio command value, thereby keeping the boosted voltage Vout at the set value $V_{ST}$.

When the battery voltage Vin drops below the first preset voltage value V1 at time t2, the microcomputer 11 causes the warning lamp to blink, and decreases the duty ratio command value in accordance with the current decreasing rate of the battery voltage Vin, to thereby decrease the boosted voltage Vout. As the result of decreasing the duty ratio command value, if the battery voltage Vin increases to its original voltage level as indicated by a dotted line, the boosted voltage Vout also returns to its original voltage level.

If the state of Vin<V1 continues for Δt or longer, the microcomputer 11 judges that the battery system is abnormal, and on this judgement, decreases the boosted voltage Vout at a preset gradient while at the same time switches the light furnishing mode of the warning lamp to a continuous mode. With the decrease of the boosted voltage Vout at a preset gradient, the boosted voltage Vout becomes equal to the battery voltage Vin.

At time t4, if the battery voltage Vin increases above the first preset voltage value V1, the microcomputer 11 judges that the battery system is restored to its normal state, and increases the boosted voltage Vout at a preset gradient. The threshold value as a criterion in judging that the battery system is restored to the normal state may be a third preset voltage value V3, higher than the first preset voltage value V1. Where the third preset voltage value V3 is used, the judgement that the battery system is restored to the normal state is made at time t4', and the boosted voltage Vout increases at a given gradient as indicated by a broken line.

A hysteresis may be used for the criterion of the judgement that the battery system is restored to the normal state. Provision of the hysteresis brings about various advantages. The frequency of a large variation of the assist force is reduced. An unnatural feeling is eliminated in the steering operation. The MDPS operation may proceed in a state that the battery voltage Vin is satisfactorily restored. Further, the annoying blinking of the warning lamp can also be minimized.

At time t5, the battery voltage Vin drops below the first preset voltage value V1. Then, as in the operation at time t2, the microcomputer 11 causes the warning lamp to blink, and decreases the duty ratio command value in accordance with a decreasing rate of the battery voltage Vin, to thereby decrease the boosted voltage Vout. Then, if the battery voltage Vin drops below the second preset voltage value V2 before the time period Δt terminates, the microcomputer 11 determines that the battery system is abnormal, and decreases the boosted voltage Vout at a given gradient, while at the same time causes the warning lamp to switch its light furnishing mode to a continuous mode. With the decrease of the boosted voltage Vout at a given gradient, the boosted voltage Vout reaches to the battery voltage Vin.

In the first embodiment, the blinking mode of the warning lamp starts at time t2 (t6), and the continuous mode starts at time t3 (t5). In other words, the warning lamp is lit on in stepwise manner. Alternatively, the warning lamp may be placed to the continuous mode.

(Operation of the microcomputer 11 according to a Second Embodiment)

Figure 6:
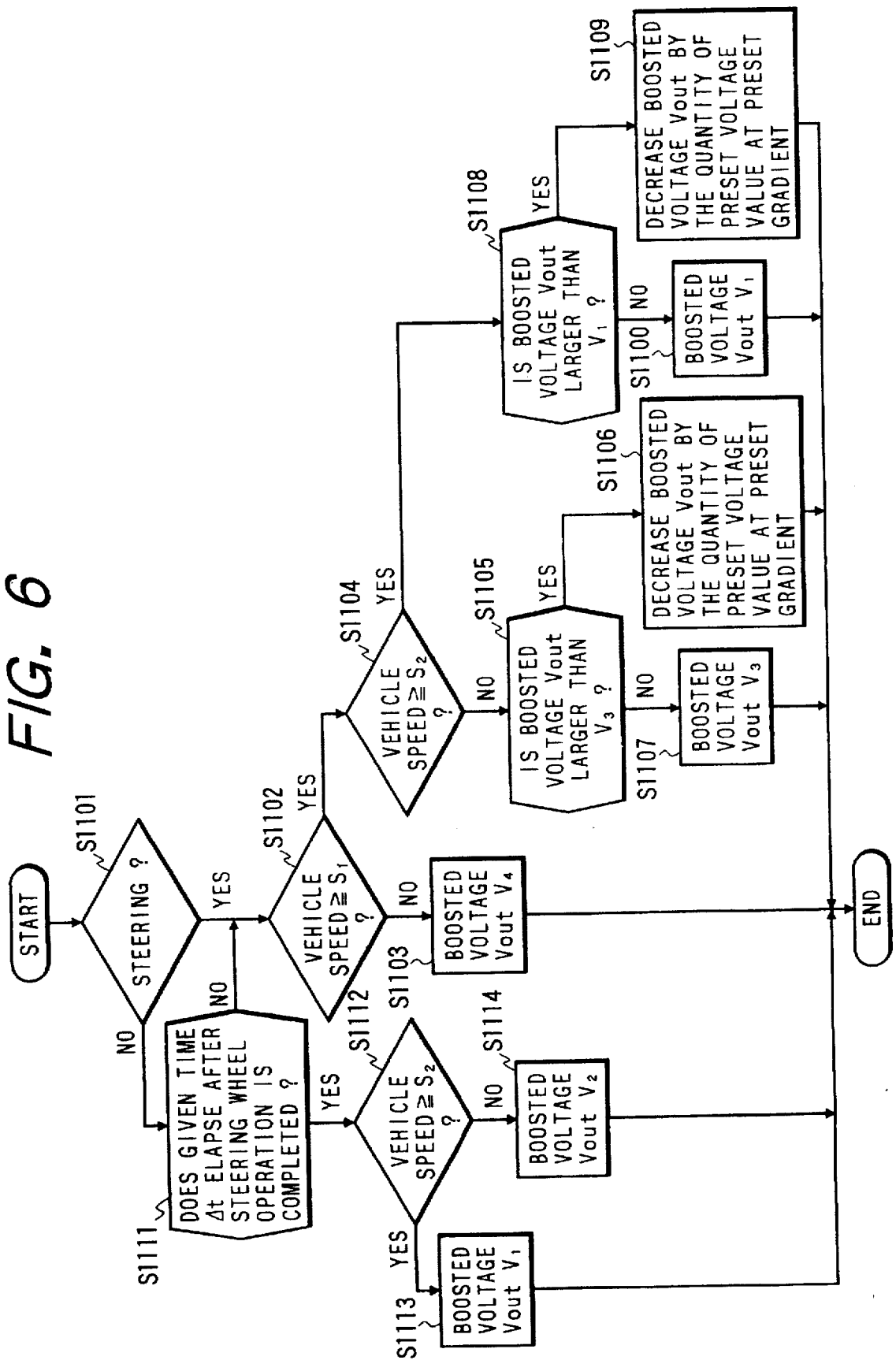
FIG. 6 is a flowchart showing a flow of a process carried out by the microcomputer shown in FIG. 2, according to a second embodiment.

An operation of the microcomputer 11 according to a second embodiment will be described with reference to FIG. 6. The microcomputer 11 controls the boosting operation of the boosting circuit 12 to decrease the boosted voltage Vout in accordance with steering conditions and vehicle running conditions. Specifically, when a high boosted voltage Vout is not required for the motor 7-1', viz., a large assist force is not required, the microcomputer 11 controls the boosting operation of the boosting circuit 12 to decrease the boosted voltage Vout.

The microcomputer 11 checks whether or not an angle of the operated steering wheel is present, on the basis of a signal representative of an angle of the operated steering wheel, which is produced by the steering-wheel angle sensor 5 (step S1101). If the steering wheel is operated, the microcomputer 11 checks whether or not a vehicle speed, derived from the speed sensor 4, is above a first preset speed value S1 (S1=20 km/h in this embodiment) (step S1102). If the vehicle speed is lower than the first preset speed value S1, the microcomputer 11 controls the boosted voltage Vout to a fourth preset value V4 of voltage (V4=100 V in the embodiment) (step S1103). If the vehicle speed is higher than the first preset speed value S1, the microcomputer 11 checks whether or not it is higher than a second preset value S2 of speed (S2=80 km/h in the embodiment), higher than the first preset speed value S1 (step S1104).

If the vehicle speed is lower than the second preset speed value S2, the microcomputer 11 checks if the present boosted voltage Vout is higher than a third preset value V3

(V3=70 V in this embodiment) of voltage (step S1105). If the boosted voltage Vout is higher than the third preset voltage value V3, the microcomputer 11 decreases the boosted voltage Vout by a quantity of a preset voltage value at a preset gradient (step S1106). Thus, the boosted voltage Vout decreases at a given gradient under the conditions that the vehicle speed is higher than the first preset speed value S1 but lower than the second preset speed value S2, and the boosted voltage Vout is higher than the third preset voltage value V3. If the boosted voltage Vout is lower than the third preset voltage value V3, viz., the answer to the step S1105 is NO, the microcomputer 11 advances to a step S1107 where it controls the boosted voltage Vout to the third preset voltage value V3.

If the vehicle speed is higher than the second preset speed value S2, the microcomputer 11 checks if the present boosted voltage Vout is higher than the first preset voltage value V1 (V1=12 V in this embodiment) (step S1108). If it is higher than the first preset voltage value V1, the microcomputer 11 decreases the boosted voltage Vout by a quantity of a preset voltage value at a preset gradient (step S1109). Thus, the boosted voltage Vout decreases at a preset gradient under the conditions that the vehicle speed is higher than the second preset speed value S2 and the boosted voltage Vout is higher than the first preset voltage value V1. When the boosted voltage Vout goes below the first preset voltage value V1, viz., the answer to the step S1108 is NO, the microcomputer 11 controls the boosted voltage Vout to the first preset voltage value V1.

If the steering wheel is not operated in the step S1101, the microcomputer 11 checks if a given time Δt elapses after the operation of the steering wheel is completed (step S1111). If it has not elapsed, the microcomputer 11 goes to the step S1102. If the time Δt elapses, the microcomputer 11 checks the vehicle speed (step S1112). If the vehicle speed is higher than the second preset speed value S2, the microcomputer 11 controls the boosted voltage Vout to the first preset voltage value V1 (step S113). If the vehicle speed is lower than the second preset speed value S2, the microcomputer 11 controls the boosted voltage Vout to the second preset value V2 (V2=20 V in this embodiment) (step S1114).

The boosted voltage Vout is adjusted dependent on a duty ratio command value outputted from the terminal B of the microcomputer 11, as a matter of course. If the duty ratio command value is reduced, the boosting operation of the boosting circuit 12 is held down. The boosted voltage Vout drops. Consequently, the consumption of energy in the boosting circuit 12 becomes small. When the duty ratio command value is set at 0, the boosting operation of the boosting circuit 12 stops. The boosted voltage Vout becomes equal to the battery voltage Vin. In the present embodiment, V1=Vin.

Figure 7A:
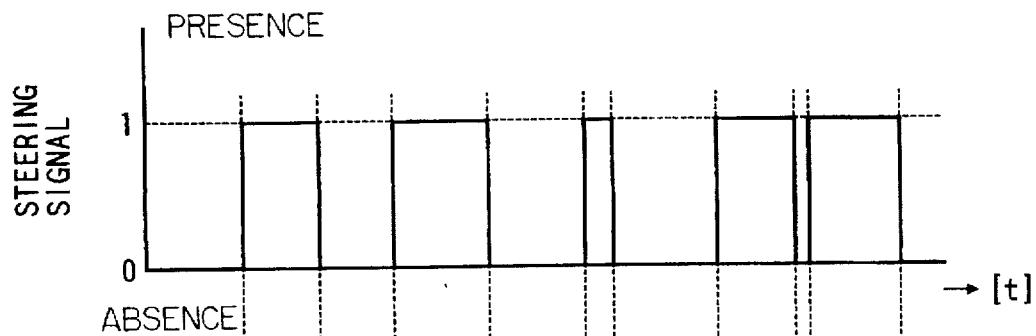
FIGS. 7A to 7C are graphs showing variations of a steering signal, a vehicle speed signal, and a boosted voltage Vout, respectively.
Figure 7B:
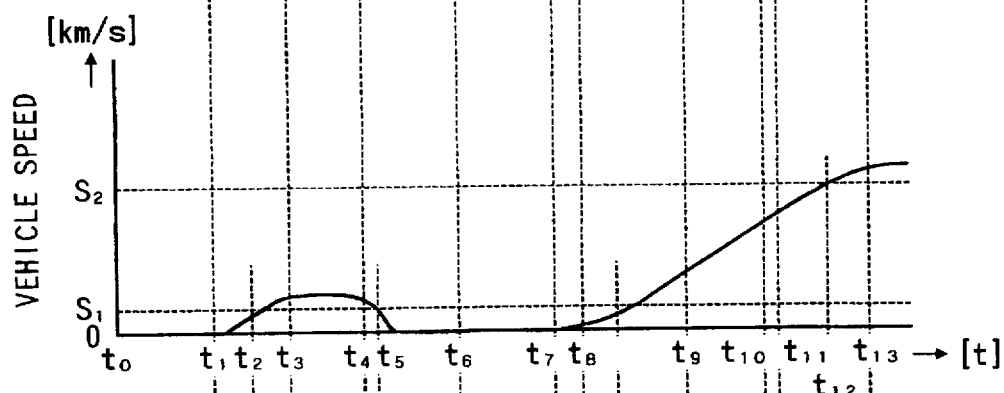
Figure 7C:
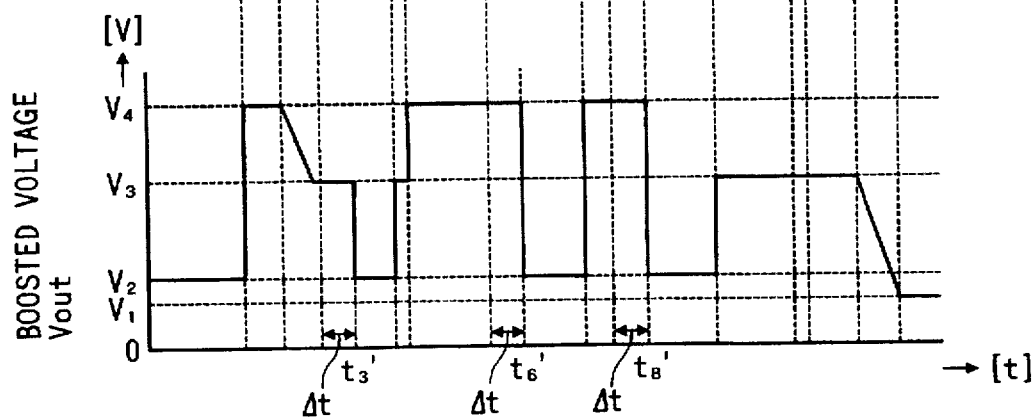

FIGS. 7A to 7C show variations of a steering signal (FIG. 7A), a vehicle speed signal (FIG. 7B), and a boosted voltage Vout (FIG. 7C). During a period of time from time t1 to t2, the steering wheel is not operated and the vehicle speed is 0. Then, the boosted voltage Vout is set at the second preset value V2 (=20 V). Under this condition, the boosted voltage Vout may be set at the first preset voltage value V1 (12 V). In this embodiment, V2 (second preset value), somewhat higher than V1 (first preset voltage value), is applied to the motor 7-1', in order to improve the response at the start of the steering operation.

At time t1, the steering wheel is operated. In response to the steering operation, the boosted voltage Vout rises to V4 (fourth preset voltage value) (100 V). This is because a large assist force is needed since the vehicle speed is 0 at this time. The vehicle speed increases and exceeds S1 (first preset speed value) (20 km/h) at time t2. The boosted voltage Vout drops at a preset gradient to V3 (third preset voltage value) (70 V). At this time, the vehicle is in a running state. The assist force which is smaller than that when the vehicle is standstill is required.

At time t3, the steering operation stops. At time t3' after the time duration Δt from the stop of the steering operation, the boosted voltage Vout drops to V2. The boosted voltage Vout is kept at V3 during a period of Δt after the steering operation terminates. Keeping of the boosted voltage Vout at V3 eliminates an unnatural feeling of the steering operation when the steering wheel is operated again at an early time immediately after the stop of the steering operation.

At time t4, the steering operation starts again. At this time, the vehicle speed is higher than S1. Then, the boosted voltage Vout is controlled to V3. When the vehicle speed decreases to below S1, the boosted voltage Vout is controlled to V4. At time t6, the steering operation stops. At time t6' after the time duration Δt from the stop of the steering operation, the boosted voltage Vout drops to V2.

The steering wheel is operated during a period between time t7 and t8. The boosted voltage Vout is kept at V4 during a period from t7 to t8' since the vehicle speed is lower than S1. At time t9, the steering operation starts again. The boosted voltage Vout is controlled to V3 since the vehicle speed is higher than S1 at this time t9. At time t10 the steering operation stops. At time t11 before a time duration Δt elapses from the time t10, the steering wheel is operated again. The boosted voltage Vout is kept at V3, while not dropping.

At time t12, the vehicle speed exceeds S2 (second preset speed value) (80 km/h). The boosted voltage Vout drops at a preset gradient to V1 (12 V). At this time, the vehicle speed is high, in excess of S2. The assist force may be controlled to zero, in order to secure a good vehicle stability. In this case, V1 is not always controlled et at 12 V, but it may be controlled in accordance with S2.

As described above, the vehicle power steering system of the present invention operates in the following manner. When a state of no steering operation continues for the time duration Δt, the boosted voltage Vout is reduced so long as a satisfactory response is secured. When the vehicle speed reaches S1 or S2, the boosted voltage Vout is decreased in accordance with the current vehicle speed. Accordingly, the boosting operation of the boosting circuit 12 is held down. The energy consumption by the boosting circuit 12 is controlled to the tolerable minimum, thereby realizing the energy saving.

In the above-mentioned embodiment, the presence or absence of the steering operation, and the vehicle speed are used for holding down the boosting operation of the boosting circuit 12. Examples of other suitable variables that may be used for the same purpose are steering wheel operating speed, steering wheel angle, vehicle yawing rate, lateral gravity acceleration, and such a steering condition as running mode.

Where any of those enumerated variables is used, the boosted voltage Vout is reduced when the steering wheel operating speed is slow, the steering wheel angle is small, the vehicle yawing rate is small, the lateral gravity acceleration is small, or a sport mode is set up.

(Operation of the microcomputer 11 according to a Third Embodiment)

The operation of the microcomputer 11 according to a third embodiment will be described in connection with some functions thereof.

The microcomputer 11 operates such that the computer increases the boosted voltage Vout as the current I (motor drive current) fed to the motor 7-1' increases, and decreases the boosted voltage Vout when the current I decreases. When a load of the motor 7-1' is small, viz., a large assist force is not required, the microcomputer holds down the boosting operation of the boosting circuit 12 to decrease the boosted voltage Vout. When the load of the motor 7-1' is increased, viz., a large assist force is required, the microcomputer 11 increases the boosted voltage Vout.

Figure 8:
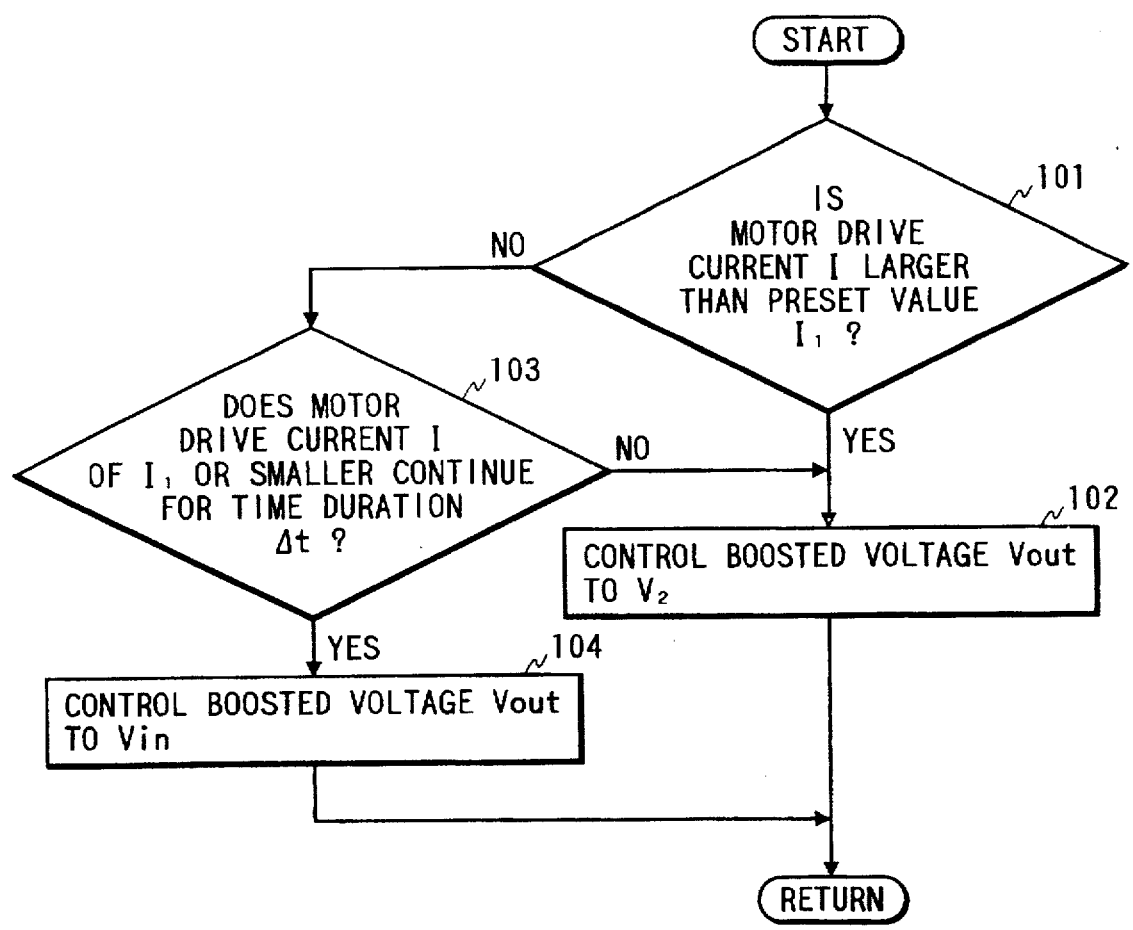
FIG. 8 is a flowchart showing a flow of a process carried out by a microcomputer shown in FIG. 2, according to a third embodiment.

A process carried out by the microcomputer 11 of the third embodiment will be described with reference to a flowchart shown in FIG. 8.

The microcomputer 11 checks a motor drive current I received at the terminal H (step S2101). If the motor drive current I is above a preset value I1, the microcomputer 11 controls the boosted voltage Vout to a second preset value V2 (V2=100 V in this embodiment) (step S2102).

In the step S2101, if the motor drive current I is below the preset value I1, the microcomputer 11 checks if a state that the motor drive current I is below a preset value I1 continues for a preset time period Δt, viz., the motor drive current I of the preset value I1 or smaller continues for the time duration Δt or longer (step S2103). If the answer is NO, the microcomputer 11 goes to a step S2102. If the answer is YES, the microcomputer 11 decreases the boosted voltage Vout to the battery voltage Vin (step S2104).

The boosted voltage Vout is adjusted dependent on a duty ratio command value outputted from the terminal B of the microcomputer 11, as a matter of course. If the duty ratio command value is reduced, the boosting operation of the boosting circuit 12 is held down. The boosted voltage Vout drops. Consequently, the consumption of energy in the boosting circuit 12 becomes small. When the duty ratio command value is set at 0, the boosting operation of the boosting circuit 12 stops. The boosted voltage Vout becomes equal to the battery voltage Vin.

FIGS. 9A and 9B show a variation of the motor drive current I and a variation of the boosted voltage Vout, respectively.

During a period from time t0 to t1, no steering operation is performed, and the motor drive current I is below the preset value I1 Accordingly, the boosted voltage Vout is controlled to the battery voltage Vin.

Upon the start of the steering operation, the motor drive current I increases. When it exceeds the preset value I1 (at time t1), the boosted voltage Vout is increased to V2 (second preset value) (=100 V).

Upon the completion of the steering operation, the motor drive current I decreases to below the preset value I1 (at time t2). This state continues for the time duration Δt (time t2') or longer, and the boosted voltage Vout is reduced to the battery voltage Vin. In other words, after the motor drive current I decreases to below the preset value I1, the boosted voltage Vout is kept for the time duration Δt. With the thus timed operation, in the steering operation that is commenced again at an early time immediately after the previous steering operation ends, a natural feeling is secured in the steering operation.

The steering operation is commenced again and the motor drive current I increases to above the preset value I1 (at time t3). At this time, the boosted voltage Vout is increased to V2 (second preset value) as in the operation at time t1. Upon the completion of the steering operation, the motor drive current I decreases to below the preset value I1 (time t4). Before the time duration Δt elapses from time t4, the steering wheel is turned again. In other words, if the motor drive current I takes a value of I1 or larger during a period (Δt) from time t4 to time t4', the boosted voltage Vout does not decrease and is kept at V2.

Upon the completion of the steering operation, the motor drive current I decreases to below the preset value I1 (at time t5). This state continues for the time duration Δt (time t5') or longer, and the boosted voltage Vout is reduced to the battery voltage Vin.

As described above, in the vehicle power steering system of the present embodiment, if the motor drive current I continues for the time duration Δt or longer and increases to exceed I1 (preset value), the boosted voltage Vout is decreased to the battery voltage Vin. Accordingly, a wasteful consumption of energy in the boosting circuit 12 is minimized, thereby securing the energy saving.

In the above-mentioned embodiment, the motor drive current I is used for monitoring the load of the motor 7-1'. A motor rotational speed of the motor 7-1' or any other suitable variable may be used for the same purpose.

When the motor drive current I decreases to the preset value I1, the boosted voltage Vout is reduced to the battery voltage Vin in the above-mentioned embodiment. It may be reduced to another value of voltage, as a matter of course.

A single value, the preset value I1, is used for the reference value for the judgement of decreasing (increasing) the boosted voltage Vout in the embodiment. Alternatively, a plural number of reference values are used. In this case, the boosted voltage Vout is stepwise decreased (increased).

Further, such a modification that the boosted voltage Vout is increased as the motor drive current I increases and it is decreased as the current I decreases, is allowed.

In the above-mentioned embodiments, the boosting circuit 12 using the coil L1 may be substituted by a boosting circuit using a transformer. In other words, the boosting circuit is not limited to the circuit arrangement of the boosting circuit 12 of the embodiment, but may be realized in any of other suitable circuits if it can set the boosted voltage at a desired value.

Figure 5:
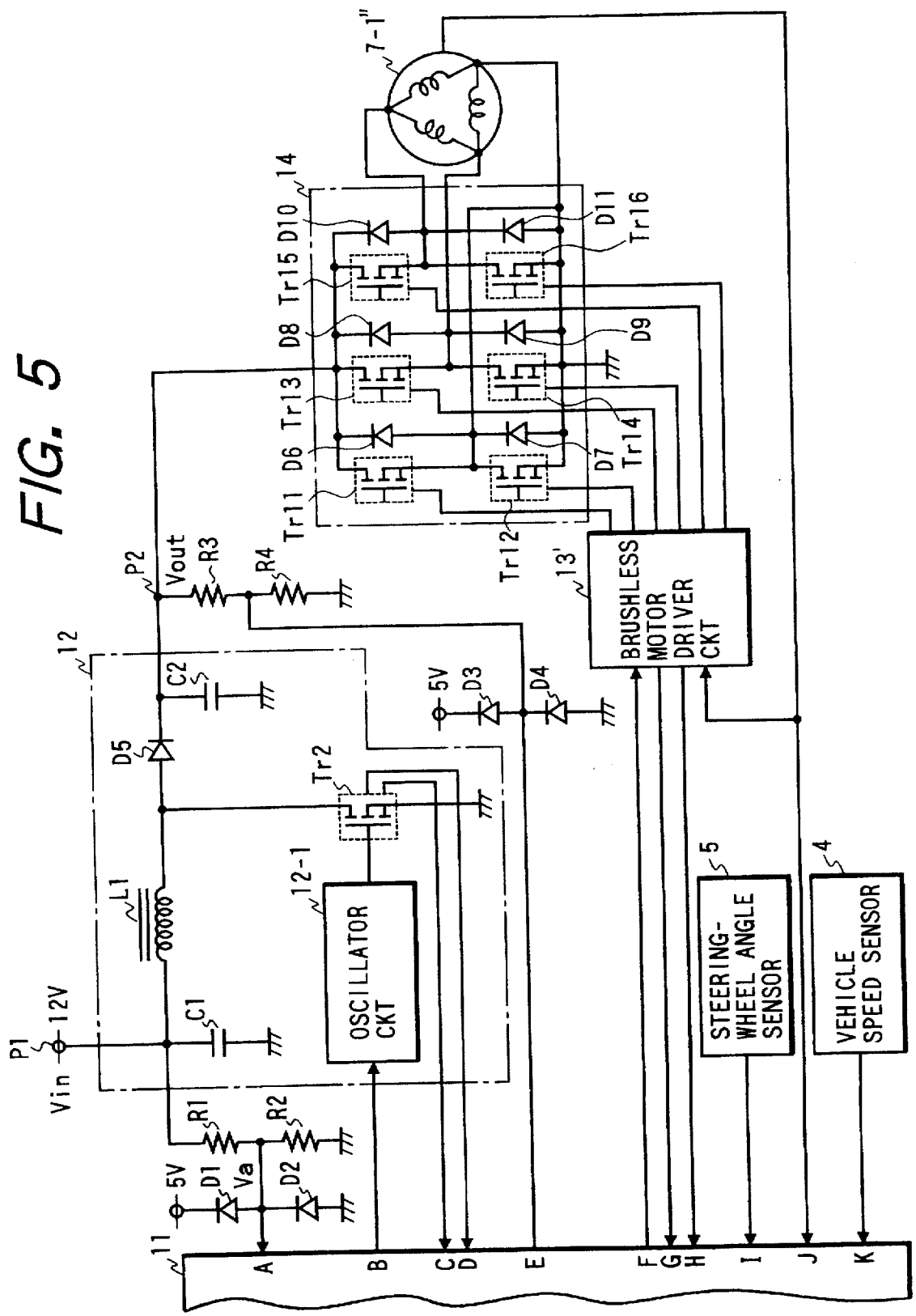
FIG. 5 is a circuit diagram showing a major portion of another MDPS in which a DC brushless motor is used in place of a DC brush motor, which is used in the MDPS of FIG. 2.

In the above-mentioned embodiments, the motor 7-1' is the DC brush motor. If required, a DC brushless motor may be used in place of the DC brush motor. A key portion of a circuit diagram of the MDPS when the DC brushless motor is used for the motor 7-1' is shown in FIG. 5. The MDPS uses a motor drive system which includes a motor drive circuit 13', and a transistor circuit 14 containing power transistors Tr11 to Tr16 and diodes D6 to D11. The motor drive system adjusts the current fed to a DC brushless motor 7-1". Where the DC brushless motor is used, there is no need of the replacement of the brush of the motor (the brush is replaced with a new one at the interval of the run of 2000 to 3000 km in a continuous operating condition). Accordingly, a long life of the motor is ensured with a high stability.

While the present invention has been described using the MDPS, the invention may be applied to the FEPS, as a matter of course. Further, the invention may be used irrespective of the type of motor vehicle, such as a motor vehicle driven by an internal combustion engine and an electric vehicle, and the type of the battery voltage, such as a 12 V battery and a 24 V battery.

In a case where the MDPS is assembled into the electric vehicle, a high voltage source as a vehicle drive source will be used for the motor for driving the pump. In this case, the technical idea of the present invention may be applied to the circuit for decreasing the voltage of the high voltage source, whereby the stabilization of the decreased voltage, the fail-safe function, and the energy saving are also realized as in the above-mentioned embodiments.

As seen from the foregoing description, in the invention, the battery voltage is increased, and a large motor torque can be produced using a small current. The size reduction of the motor specified for high voltage (e.g., 100 V) is realized, and the wires for electric connection are thinned. As a result, the cost of the overall system is reduced. The boosted voltage is little varied when the battery voltage varies. The assist force of the battery is insensitive to a variation of the battery voltage. A high accuracy control of the assist force is secured.

Also, in the first aspect of the invention, the boosted voltage Vout is kept at a fixed value of voltage, and it is little influenced by a variation of the battery voltage.

Further, in the first aspect of the invention, when the boosted voltage goes below a first preset voltage value V1, the boosted voltage Vout is decreased at the current decreasing rate of the battery voltage. As a result, a load to the battery is reduced, possibly quickening the restoration of the battery voltage to its normal level of voltage.

Still further, in the first aspect of the invention, when a state of the boosted voltage being below a first preset voltage value V1 continues for a time duration Δt or longer, the boosted voltage Vout decreases at a preset gradient. The assist force is naturally reduced without abrupt decrease thereof, thereby to secure the fail-safe.

Yet still further, in the first aspect of the invention, when the battery voltage goes below a second preset voltage value V2, the boosted voltage Vout decreases at a preset gradient. Accordingly, as the battery voltage drops below the second preset voltage value V2, the assist force is naturally reduced, thereby securing the fail-safe.

In the second aspect of the invention, when a state of no steering operation continues for a preset time duration, the boosting operation of the boosting circuit is held down to reduce the boosted voltage Vout. In this case, the boosting operation may be stopped, if necessary.

Also, in the second aspect of the invention, when the vehicle speed exceeds a preset value of speed, the boosting operation of the boosting circuit is held down to reduce the boosted voltage Vout. In this case, the boosting operation may be stopped, if necessary.

Further, in the second aspect of the invention, when a state of no steering operation continues for a preset time duration or the vehicle speed exceeds a preset value of speed, the boosting operation of the boosting circuit is held down to reduce the boosted voltage Vout. In this case, the boosting operation may be stopped, if necessary.

In the third aspect of the invention, when the load of the motor is indicated by a value above a preset value I1, the boosted voltage Vout applied to the motor is increased. When a load of the motor, indicated by a value below a preset value I1, continues for a preset time period Δt, the boosted voltage Vout is decreased. Also, the boosted voltage Vout varies in accordance with a load of the motor. When the load of the motor is small, viz., a large assist force is not required, the boosted voltage Vout is reduced. Accordingly, a wasteful consumption of energy in the boosting circuit is minimized, thereby securing the energy saving.

What is claimed is:

1. A vehicle power steering system for controlling an assist force which supplementally supports the steering operation, comprising:

a motor for producing the assist force;

a battery for supplying a current to said motor;

a speed sensor for detecting a vehicle speed;

a steering-wheel angle sensor for detecting an angle of a steering wheel;

means for adjusting the current fed from said battery to said motor according to the vehicle speed detected by said speed sensor and the angle of the steering-wheel detected by said steering-wheel angle sensor;

a booster inserted in a current feed path to the motor for boosting a battery voltage of said battery to apply a boosted voltage to said motor;

boosted-voltage stabilizing means for controlling the boosted voltage to a predetermined value through an operation of monitoring the boosted voltage; and boosted-voltage decreasing means for decreasing the boosted voltage according to a drop rate of the battery voltage when said boosted-voltage decreasing means detects that the boosted voltage is smaller than a first predetermined value through the operation of monitoring the voltage of said battery.

2. A vehicle power steering system for controlling an assist force which supplementally supports the steering operation, comprising:

a motor for producing the assist force;

a battery for supplying a current to said motor;

a speed sensor for detecting a vehicle speed;

a steering-wheel angle sensor for detecting an angle of a steering wheel;

means for adjusting the current fed from said battery to said motor according to the vehicle speed detected by said speed sensor and the angle of the steering-wheel detected by said steering-wheel angle sensor;

a booster inserted in a current feed path to the motor for boosting a battery voltage of said battery to apply a boosted voltage to said motor;

boosted-voltage stabilizing means for controlling the boosted voltage to a predetermined value through an operation of monitoring the boosted voltage; and fail-safe means for decreasing the boosted voltage at a predetermined gradient when detecting that a state of the boosted voltage being smaller than a first predetermined value, continues for a predetermined duration or longer, through the operation of monitoring the voltage of said battery.

3. A vehicle power steering system for controlling an assist force which supplementally supports the steering operation, comprising:

a motor for producing the assist force;

a battery for supplying a current to said motor;

a speed sensor for detecting a vehicle speed;

a steering-wheel angle sensor for detecting an angle of a steering wheel;

means for adjusting the current fed from said battery to said motor according to the vehicle speed detected by said speed sensor and the angle of the steering-wheel detected by said steering-wheel angle sensor;

a booster inserted in a current feed path to the motor for boosting a battery voltage of said battery to apply a boosted voltage to said motor;

boosted-voltage stabilizing means for controlling the boosted voltage to a predetermined value through an operation of monitoring the boosted voltage; and fail-safe means for decreasing the boosted voltage at a predetermined gradient when detecting that the battery voltage is smaller than a second predetermined value through the operation of monitoring the voltage of said battery.

4. A vehicle power steering system for controlling an assist force which supplementally supports the steering operation, comprising:

a motor for producing the assist force;

a battery for supplying a current to said motor;

a speed sensor for detecting a vehicle speed;

a steering-wheel angle sensor for detecting an angle of a steering wheel;

means for adjusting the current fed from said battery to said motor according to the vehicle speed detected by said speed sensor and the angle of the steering-wheel detected by said steering-wheel angle sensor;

a booster inserted in a current feed path to the motor for boosting a battery voltage of said battery to apply a boosted voltage to said motor; and a voltage decreasing means for restraining the boosting operation of said booster according to a steering condition to decrease the boosted voltage;

wherein said steering condition is set by a factor selected from a croup consisting of steering wheel operating speed and steering wheel angle.

5. A vehicle power steering system for controlling an assist force which supplementally supports the steering operation, comprising:

a motor for producing the assist force;

a battery for supplying a current to said motor;

a speed sensor for detecting a vehicle speed;

a steering-wheel angle sensor for detecting an angle of a steering wheel;

means for adjusting the current fed from said battery to said motor according to the vehicle speed detected by said speed sensor and the angle of the steering-wheel detected by said steering-wheel angle sensor;

a booster inserted in a current feed path to the motor for boosting a battery voltage of said battery to apply a boosted voltage to said motor; and voltage decreasing means for restraining the boosting operation of said booster according to a running condition to decrease the boosted voltage;

wherein said running condition is set by a factor selected from a group consisting of vehicle yawing rate, and lateral acceleration.

6. A vehicle power steering system for controlling an assist force which supplementally supports the steering operation, comprising:

a motor for producing the assist force;

a battery for supplying a current to said motor;

a speed sensor for detecting a vehicle speed;

a steering-wheel angle sensor for detecting an angle of a steering wheel;

means for adjusting the current fed from said battery to said motor according to the vehicle speed detected by said speed sensor and the angle of the steering-wheel detected by said steering-wheel angle sensor;

a booster inserted in a current feed path to the motor for boosting a battery voltage of said battery to apply a boosted voltage to said motor; and a voltage decreasing means for restraining the boosting operation of said booster according to a steering condition and a running condition to decrease the boosted voltage;

wherein said steering condition is set by a factor selected from a group consisting of steering wheel operating speed and steering wheel angle; and wherein said running condition is set by a factor selected from a group consisting of vehicle yawing rate, lateral acceleration and running mode.

7. A vehicle power steering system for controlling an assist force which supplementally supports the steering operation, comprising:

a motor for producing the assist force;

a battery for supplying a current to said motor;

a speed sensor for detecting a vehicle speed;

a steering-wheel angle sensor for detecting an angle of a steering wheel;

means for adjusting the current fed from said battery to said motor according to the vehicle speed detected by said speed sensor and the angle of the steering-wheel detected by said steering-wheel angle sensor; and a booster inserted in a current feed path to the motor for boosting a battery voltage of said battery to apply a boosted voltage to said motor; and voltage increasing means for increasing the boosted voltage when a load of said motor is a predetermined value or more, through the operation of monitoring the load.

8. A vehicle power steering system as claimed in claim 7, further comprising voltage decreasing means for decreasing the boosted voltage when the load of said motor being smaller than the predetermined value for a predetermined duration, through the operation of monitoring the load.

* * * * *